United States Patent
Lou et al.

(10) Patent No.: US 11,561,831 B2
(45) Date of Patent: Jan. 24, 2023

(54) DYNAMIC ADJUSTMENT OF RESPONSE TIME

(71) Applicant: HEWLETT PACKARD ENTERPRISE DEVELOPMENT LP, Houston, TX (US)

(72) Inventors: Ju-Chun Lou, Taipei (TW); Glen I-Chun Shih, Taipei (TW); Ryan Armstrong, Houston, TX (US); Johnny Hung, Taipei (TW)

(73) Assignee: Hewlett Packard Enterprise Development LP, Spring, TX (US)

( * ) Notice: Subject to any disclaimer, the term of this patent is extended or adjusted under 35 U.S.C. 154(b) by 433 days.

(21) Appl. No.: 16/779,454

(22) Filed: Jan. 31, 2020

(65) Prior Publication Data
US 2021/0240533 A1   Aug. 5, 2021

(51) Int. Cl.
*G06F 9/50* (2006.01)
*G06N 20/00* (2019.01)

(52) U.S. Cl.
CPC .......... *G06F 9/5005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 6,694,009 B1 | 2/2004 | Anderson et al. | |
| 8,761,380 B2 | 6/2014 | Kohler et al. | |
| 2012/0066683 A1* | 3/2012 | Srinath | G06F 9/4887 718/102 |
| 2014/0180848 A1 | 6/2014 | Argue et al. | |
| 2016/0321548 A1 | 11/2016 | Ziskind et al. | |
| 2019/0318287 A1* | 10/2019 | Asthana | G06N 20/00 |

* cited by examiner

*Primary Examiner* — Eric C Wai
(74) *Attorney, Agent, or Firm* — Mauriel Kapouytian Woods LLP

(57) ABSTRACT

Examples described herein relate to method and system for determining a response time for an action. A request for an action may be communicated from a source entity to a target entity. The action is generated by the source entity and which is to be responded by the target entity. Further, a response time corresponding to the action may be determined based on prior execution experience of one or more jobs associated with the action and a learning rate. Thereafter, the source entity may be allowed to wait for a response corresponding to a completion of the action from the target entity for at least a time duration corresponding to the response time.

23 Claims, 6 Drawing Sheets

| JOB IDENTIFIER (i) | OCCURRENCE | JOB NAME | ACTUAL RESPONSE TIME $T_{Actual}$ | EXPERIENCED TIME OF EXECUTION (MOVING AVERAGE) $T_{Experienced_i}$ |
|---|---|---|---|---|
| 1 | 1st | JOB - A | UNKNOWN | UNKNOWN |
| 1 | 2nd | JOB - A | 38 | 38 |
| 1 | 3rd | JOB - A | 32 | 35 |
| 1 | 4th | JOB - A | 20 | 27.5 |
| 2 | 1st | JOB - B | UNKNOWN | UNKNOWN |
| 2 | 2nd | JOB - B | 50 | 50 |
| 2 | 3rd | JOB - B | 45 | 47.5 |

*FIG. 3*

DYNAMIC ADJUSTMENT OF RESPONSE TIME

BACKGROUND

After a source entity sends a request for an action to be fulfilled by a target entity, a wait state mechanism of the source entity may wait for a response from the target entity for a certain time period that is usually set to a predefined or fixed wait time value. A request timeout may occur when a response has not been received from the target entity within a designated time period after communicating the request to the target entity.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein:

FIG. 3 is an experience table, accordance with an example;

Figure 1:
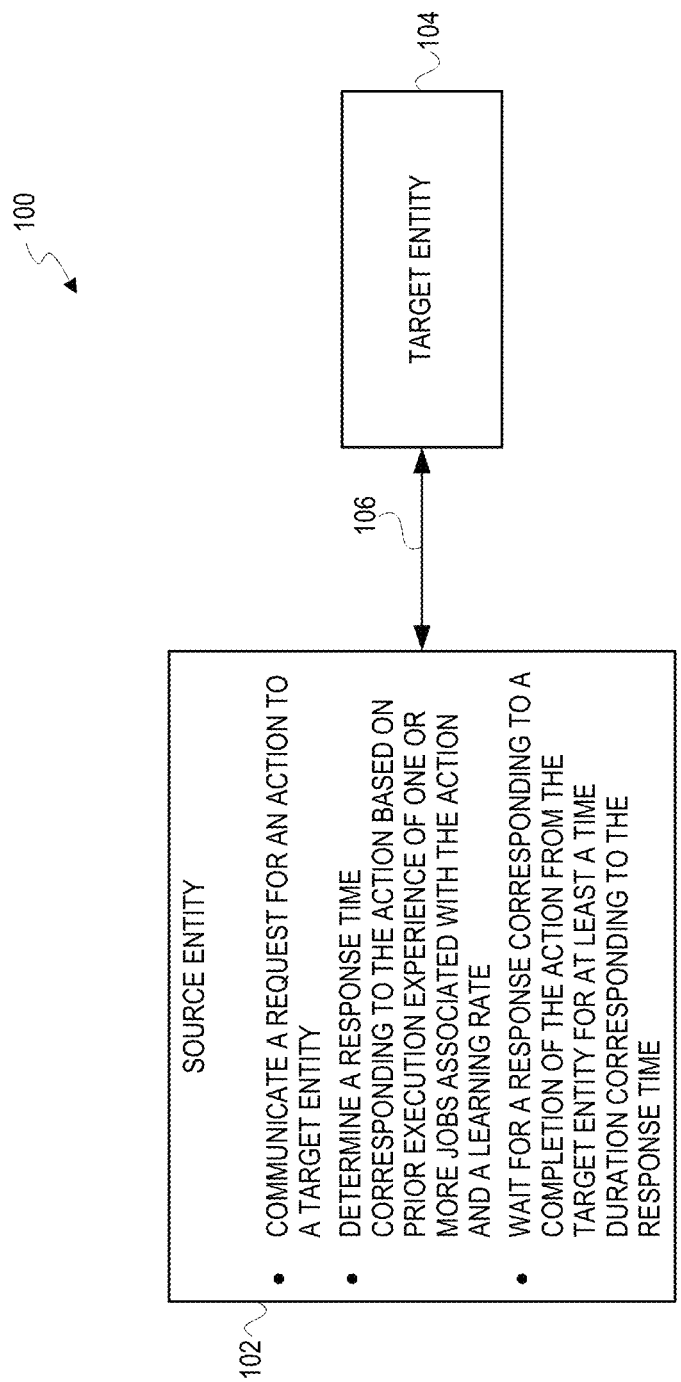
FIG. 1 is a system comprising various components including a source entity in communication with a target entity for dynamically adjusting a response time, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. As used herein, the term "includes" means includes but not limited to, the term "including" means including but not limited to. The term "based on" means based at least in part on.

After a source entity sends a request for an action to be fulfilled by a target entity, a wait state mechanism of the source entity may wait for a response from the target entity for a certain time period that is usually set to a predefined or fixed wait time value. A request timeout may occur when a response has not been received from the target entity within a designated time period after communicating the request. When a timeout occurs, the request may be aborted. Moreover, the request may need to be re-sent to the target entity, which may cause a delay in processing the request.

The term "source entity," as used herein, may refer to a computing device (e.g., a client computing device such as a laptop computing device, a desktop computing device, an all-in-one computing device, a thin client, a workstation, a tablet computing device, a mobile phone, an electronic book reader, a network-enabled appliance such as a "small" television, smart watch, a server computing device, any virtual computing devices such as a virtual machine, container, etc., and/or other device suitable for execution of the functionality described below), a process within a computing device, and/or a state within a process. Similarly, a "target entity," as used herein, may refer to a computing device, a process within the computing device, and/or a state within the process. The term "process," as used herein, may include a process task or a plurality of process tasks that are executed by a software application that runs on the computing device. A process may be in a particular "state" (as used herein) at a specific time. For example, a process may start from a waiting state and subsequently changed to a timeout state.

In an example scenario, the target entity may send a response to the source entity, however, the response may be received by the source entity after a time period designated by the predefined or fixed wait time value already passed. In this example scenario, simply increasing the wait time value can avoid an unwanted timeout situation. However, there are certain challenges to this solution. To adjust the predefined fixed wait time value, a software patch to or a new build of the wait time mechanism may be provided. Even if such patch or new software build is provided, an adjusted wait time value in the patch or the new software build may still be fixed. This means that the resulting wait time value may not be appropriate for all types of scenarios that can occur. For example, for a high performance server (e.g., target entity) on a high speed network, the processing time and response time of the server may be expected to be shorter. If the wait time value is adjusted down (e.g., decreased) to accommodate this particular scenario, the decreased wait time value may create many unwanted timeout events for any other servers with lower performance level and/or operating on a network with a lower speed. Moreover, if the target entity is too busy to process and/or respond to the request from the source entity, an increased wait time value may cause the source entity to wait for an unreasonably long time, resulting in an inefficient utilization of resources at the source entity.

In order to overcome abovementioned challenges, the present disclosure may provide an enhanced method for determining a response time for an action taking into account an experience gained from past executions of one or more jobs and a learning rate. For example, the method as described in the present disclosure may include communicating, by a source entity, a request for an action to a target entity. The action may be generated by the source entity and which is to be responded by the target entity. Further, a response time corresponding to the action may be determined based on prior execution experience of one or more jobs associated with the action and a learning rate. Thereafter, the source entity may be allowed to wait for a response corresponding to a completion of the action from the target entity for at least a time duration corresponding to the response time.

As will be appreciated, the example method presented herein may determine the response time during runtime without need of any sensors (e.g., software agents or hardware sensors deployed at the target entity and/or embedded in the target entity to monitor parameters such as, but not limited to, resource usage, input-output data, and temperature, related to the target entity). In fact, the system can learn from previous experience of one or more jobs and adaptively/dynamically determine the response time. Consequently, no separate software patches are required to be installed. Further, as the response time is dynamically determined, accuracy of the determined response time may be improved and customer retention may be enhanced.

Referring now to drawings, in FIG. 1, an example system 100 including a source entity 102 and a target entity 104 is depicted, in accordance with an example. The source entity 102 may communicate requests to and/or receive responses from the target entity 104. The target entity 104 may receive and/or respond to the requests from the source entity 102.

The term "source entity," as used herein, may refer to a computing device (e.g., a client computing device such as a laptop computing device, a desktop computing device, an all-in-one computing device, a thin client, a workstation, a tablet computing device, a mobile phone, an electronic book reader, a network-enabled appliance such as a "small" television, smart watch, a server computing device, any virtual computing devices such as a virtual machine, container, etc., and/or other device suitable for execution of the functionality described below), a process within a computing device, and/or a state within a process. Similarly, a "target entity," as used herein, may refer to a computing device, a process within the computing device, and/or a state within the process. The term "process," as used herein, may include a process task or a plurality of process tasks that are executed by a software application that runs on the computing device. A process may be in a particular "state" (as used herein) at a specific time. For example, a process may start from a waiting state and subsequently may get changed to a timeout state.

While the source entity 102 is depicted as a single entity in FIG. 1, the source entity 102 may include any number of entities. For example, the source entity 102 may represent a plurality of computing devices and/or a plurality of processes/states. Similarly, while the target entity 104 is depicted as a single entity in FIG. 1, the target entity 104 may include any number of entities as discussed above. In some examples, the source entity 102 and the target entity 104 may have a server-client relationship where one entity represents a client computing device while the other entity represents a server computing device. In other examples, the source entity 102 and the target entity 104 may represent different processes within a single computing device. In certain other examples, the source entity 102 and the target entity 104 may represent different states within a single process.

Further, the source entity 102 and the target entity 104 may be communicatively coupled to each other as depicted via a link 106. In some examples, such link 106 may be enabled via a network. Such network may comprise any infrastructure or combination of infrastructures that enable electronic communication between the components such as the source entity 102 and the target entity 104. Examples of such network may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network may be performed in accordance with various communication protocols such as, but not limited to, Transmission Control Protocol and Internet Protocol (TCP/IP), User Datagram Protocol (UDP), IEEE 802.11, and/or cellular communication protocols over communication links 111. The communication over the network may be enabled via a wired (e.g., copper, optical communication, etc.) or wireless (e.g., Wi-Fi®, cellular communication, satellite communication, Bluetooth, etc.) communication technologies. In some examples, the network may be enabled via private communication links including, but not limited to, communication links established via Bluetooth, cellular communication, optical communication, radio frequency communication, wired (e.g., copper), and the like. In some examples, the private communication links may be direct communication links between the source entity 102 and the target entity 104. In some examples, the network and/or the link 106 may represent a system bus (e.g., control bus, address bus, data bus, one or more electrically conductive wires, etc. that interconnects various components of a computing device).

During operation, the source entity 102 may generate a request for an action to be responded/acted-upon by the target entity 104. Generally, upon addressing the action, the target entity 104 may generate or otherwise provide a response to the request received from the source entity 102. The response may comprise an indication that the action has been successfully processed, that the action has failed, and/or any other indications in response to the status of the action. The target entity 104 may communicate the response to the source entity 102 via the link 106.

The term "action," as used herein, may refer to any action relating to command distribution, process execution, communication protocol, and/or any other actions to be processed, executed, or otherwise fulfilled by the target entity 104. For example, an action of installing a new operating system (OS) at target entity 104 relates to command distribution. A request to initiate a new FTP/HTTP session or initiate a remote management are examples of actions relating communication protocol. A request to execute certain process task (e.g., installing a new driver, invoking a new service, etc.) of a software application is an example of an action relating to process execution.

In some examples, in order to respond to an action, the target entity 104 may perform one or more jobs. For example, for an action such as powering-on a resource (e.g., a special purpose computer), jobs such as checking firmware and creating virtual machine (VM) may be executed. Further, for an action such as monitoring a resource, jobs such as the checking firmware and creating virtual machine may be executed. Also, in some examples, an action may be regarded as a job for certain other actions. For instance, an action, such as, monitoring the resource may be regarded as a job for a high-level action such as generating a health alert for the resource.

The source entity 102 may communicate, to the target entity 104, the request to be responded to by the target entity 104. The request may be communicated to the target entity 104 via the link 106 or any appropriate medium that enables communication between the source entity 102 and the target entity 104. In some implementations, the source entity 102 and the target entity 104 may have a server-client relationship where one entity represents a client computing device while the other entity represents a server computing device. Hence, the request and/or response may be communicated via a network (e.g., Internet) or any similar network that enables communication between the client computing device and the server computing device. In some implementations, the source entity 102 and the target entity 104 may represent different processes within a single computing device. In these implementations, one process may transmit a request for an action to be fulfilled by another process within a single computing device via a network such as a system bus or any similar medium that enables communication between two processes. In other implementations, the source entity 102 and the target entity 104 may represent different states within a single process. In this case, requests and/or responses may be transmitted between two different states within a single process.

The source entity 102, in accordance with some aspects of the present disclosure, may wait for the target entity 104 to respond to the request. In some examples, the source entity 102 may determine a response time within which a response from the target entity 104 may be expected to be received in response to the request. In one example, the response time may be defined as a wait time. The term wait time as used herein may represent an amount of time that the source entity 102 is allowed to wait for a response about the request until a timeout state. The "timeout state" may occur when a response has not been received from the target entity 104 within a designated time period that is set by the wait time value after transmitting the request. When a timeout occurs, the request may be aborted. According to the response time, the source entity 102 may wait for the response from the target entity 104 for at least the amount of time indicated by the response time.

In some examples, the source entity 102 may dynamically determine the response time during runtime. In some examples, the source entity 102 may dynamically adjust the response time before the source entity 102 enters into a wait state. The source entity 102 may determine the response time based on prior execution experience of the one or more jobs associated with the action and a learning rate (described later). As previously noted, an execution of an action by the target entity 104 may be accomplished by performing one or more jobs. Therefore, a time for executing the action may be determined at least as a sum of the times for completing the one or more jobs and a buffer deviation time (described later) which is a function of the learning rate.

In some examples, the source entity 102 may update an experience table (alternatively referred to as a learning table, described later) with an actual time duration for completion (i.e., actual time required to complete execution) of the jobs every time such jobs are performed. For example, if a job has already been performed prior to the source entity 102 communicating the request to the target entity 104, an actual time duration for completion of the job is stored in the experience table. In some examples, such actual time duration for completion (stored in the experience table) corresponding to a job is hereinafter referred to as the prior execution experience or an experienced time of execution that is learned by the source entity 102.

In some examples, a job might have been performed more than once before the source entity 102 sends the request for the action to the target entity 104. Depending on various parameters including but not limited to, processor and memory resource availability, number of concurrent jobs, and priority associated with the jobs, an actual time for completing the execution of the job may vary each time the job is executed. In such case, the prior execution experience or an experienced time of execution may be derived from the actual time duration for each occurrences of the job. For example, the experienced time of execution corresponding to a job of the one or more jobs is an average time of execution corresponding to all previous executions of the job. Accordingly, in some examples, the source entity 102 may update the experience table to store the average time of execution for the job based on all previous executions of the job. In certain other examples, if a job has been executed more than once, the experienced time of execution corresponding to the job may be determined as a moving average time based on all previous executions of the job and the source entity 102 may update the experience table to store such moving average time (see FIG. 3).

Further, in some examples, in order to accommodate various uncertainties in execution times due to parameters such as, but not limited to, the processor and memory resource availability, the number of concurrent jobs, and the priority associated with the jobs, the source entity 102 may also consider a buffer deviation time in determining the response time for the action to be performed by the target entity 104. The source entity 102 may determine the buffer deviation time ($T_{Buffer}$) based on a learning rate (LR) and a predetermined value (PV). Equation (1) represented below may be used to determine the buffer deviation time ($T_{Buffer}$), in one example.

$$T_{Buffer}=LR*PV \quad\quad\quad\quad \text{Equation (1)}$$

In a situation when there exists no prior experience about any job corresponding to a given action, the learning rate (LR) may be determined as 1 (one), for example, and the predetermined value (PV) may be set to a certain customizable value, for example, 60 (sixty). Accordingly, in the given example, the buffer deviation time ($T_{Buffer}$) for such an initial situation may be 60 units. The unit of the buffer deviation time ($T_{Buffer}$) may be minutes, seconds, or milliseconds, for example. It may be noted that such values of the learning rate and the predetermined value as used herein are for illustration purposes. As will be appreciated, any different values of the learning rate (LR) and the predetermined value (PV) may also be chosen, without limiting the scope of the present specification.

The source entity 102 may determine the response time for an action to be acted upon by the target entity 104 as a sum of the experienced time of execution corresponding to the one or more jobs associated with the action and the buffer deviation time. Equation (2) represented below may be used by the source entity 102 to determine a response time ($T_{Response}$), in one example.

$$T_{Response}=T_{Buffer}+\Sigma_{i=1}^{n}T_{Experienced_i} \quad\quad \text{Equation (2)}$$

In equation (2), i may represent a job identifier of a job corresponding to an action to be performed by the target entity 104, n may represent a total number of jobs, and $T_{Experienced_i}$ may represent an experienced time of execution corresponding to job i, for example. The job identifier (i)

may be a numeric, an alpha-numeric, or an alphabetic (e.g., job name) representation identifying the job, for example.

As previously noted, when there exists no previous experience regarding jobs corresponding to the action, $E_{n=i}{}^n i$ $T_{Experienced_i}$ may be zero (0), and the response time ($T_{Response}$) may be set to the buffer deviation time ($T_{Buffer}$) which is determined based on the learning rate and the predetermined value. As the experience about the jobs builds-up, the experience table gets updated with actual time duration for completion of one or more jobs. Accordingly, the source entity 102 may retrieve the experienced time of execution ($T_{Experienced_i}$) corresponding to the one or more jobs from the experience table (if available) and determine the response time ($T_{Response}$) by summing the experienced time of execution ($T_{Experienced_i}$) corresponding to the one or more jobs and the buffer deviation time ($T_{Buffer}$) (see equation (2)), for example.

Once the response time corresponding to the action to be performed by the target entity 104 is determined, the source entity 102 may wait for a response corresponding to the completion of the action from the target entity 104 for at least a time duration corresponding to the determined response time ($T_{Response}$). In one example, the response time determined by the source entity 102 may represent a maximum time duration for which the source entity 102 may wait for the response from the target entity 104.

In some examples, the target entity 104, upon addressing the action, may generate or otherwise provide the response to the request received from the source entity 102. The response may comprise an indication that the action has been successfully processed, that the action has failed, and/or any other indications in response to the status of the action. A time duration between a time at which the request has been communicated to the target entity 104 and the receipt of the response from the target entity 104 may be determined as an actual response time ($T_{Actual}$) for a given action. In some examples, the source entity 102 may update the experience table by storing the actual response time corresponding to the action in the experience table.

As previously noted, in some examples, the response time ($T_{Response}$) determined by the source entity 102 may represent a maximum time duration for which the source entity 102 may wait for the response from the target entity 104. Whereas, in some examples, the actual response time ($T_{Actual}$) may represent a minimum time duration for which the source entity 102 may wait for the response from the target entity 104. Accordingly, the actual response time ($T_{Actual}$) and the determined response time ($T_{Response}$) may define a response time range ($T_{Actual}$ to $T_{Response}$). Therefore, in certain examples, the source entity 102 may be allowed to wait for the response from the target entity 104 for any given time selected from the range defined by the actual response time ($T_{Actual}$) and the determined response time ($T_{Response}$).

As will be understood, the actual response time ($T_{Actual}$) may vary from the response time ($T_{Response}$) determined by the source entity 102. For example, the actual response time may be smaller than the determined response time, or vice-versa. The source entity 102 may also determine a difference ($T_{Actual}-T_{Response}$) between the actual response time ($T_{Actual}$) and the determined response time ($T_{Response}$). In some example, the learning rate (LR) may be updated based on such difference between the actual response time ($T_{Actual}$) and the determined response time ($T_{Response}$).

In some examples, if the difference ($T_{Actual}-T_{Response}$) is positive (i.e., $T_{Actual}>T_{Response}$), the learning rate (LR) will be increased. Consequently, the buffer deviation time ($T_{Buffer}$) may be increased, thereby moving the determined response time for any upcoming/future determination of the response time closer to the actual response time. However, in some examples, if the difference ($T_{Actual}-T_{Response}$) is negative (i.e., $T_{Act}<T_{Response}$), the learning rate (LR) will be decreased. Consequently, the buffer deviation time ($T_{Buffer}$) may also be decreased, thereby moving the determined response time for any upcoming/future determination of the response time closer to the actual response time. In some example, a magnitude of change in the learning rate (LR) may be proportional to a magnitude of the difference ($T_{Actual}-T_{Response}$).

As will be appreciated, the example method presented herein may determine the response time during runtime without need of any sensors. In fact, the system 100 can learn from previous experience of the one or more jobs and adaptively/dynamically determine the response time. Consequently, no separate software patches are required to be installed. Further, as the response time is dynamically determined, accuracy of the determined response time may be improved and customer retention may be enhanced.

Figure 2:
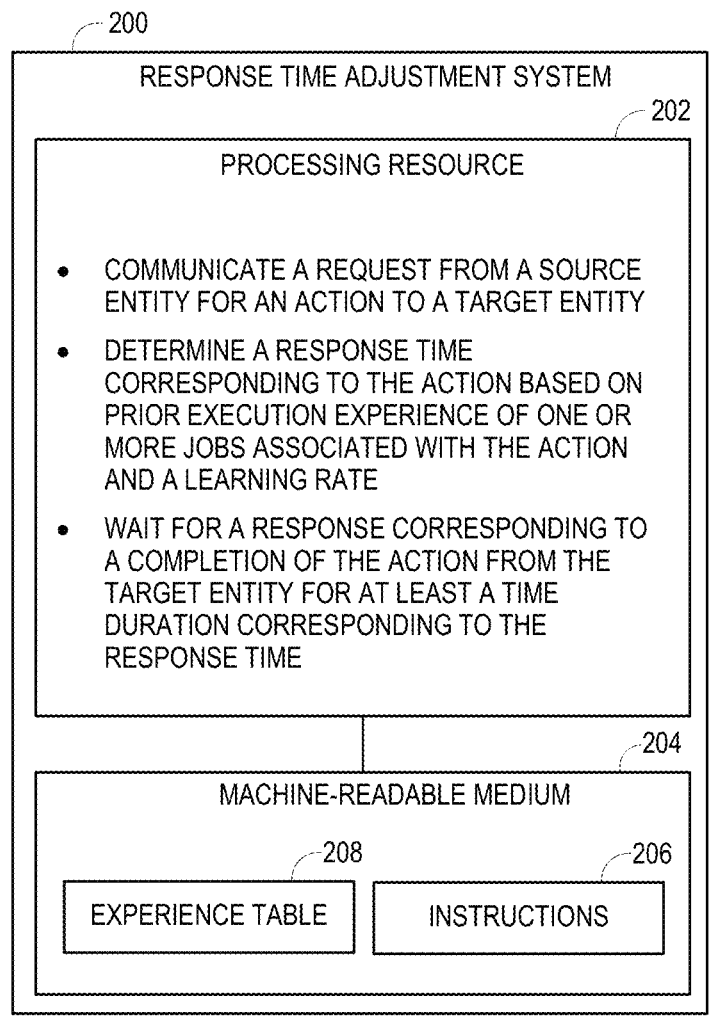
FIG. 2 is a system for adjusting a response time, in accordance with an example.

Referring now to FIG. 2, a system 200 for adjusting a response time is presented, in accordance with an example. The system 200 is hereinafter referred to as a response time adjustment system 200. In some examples, the response time adjustment system 200 may be a computing system and representative of or analogous to the source entity 102 of FIG. 1. In certain examples, the response time adjustment system 200 may host or provide a host infrastructure for the source entity 102 (e.g., a process or a state within the process). The response time adjustment system 200 may include a processing resource 202 and a machine-readable medium 204. The processing resource 202 may be coupled to the machine-readable medium 204.

The machine-readable medium 204 may be any electronic, magnetic, optical, or other physical storage device that may store data and/or executable instructions, for example, instructions 206. Therefore, the machine-readable medium 204 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 204 may be non-transitory. As described in detail herein, the machine-readable medium 204 may be encoded with executable instructions 206 for performing one or more methods, for example, methods described in FIGS. 4 and 5. In some examples, the machine-readable medium 204 may also store an experience table 208. The experience table 208 may be an example of the experience table referenced in the description of FIG. 1 hereinabove. FIG. 3 depicts the experience table 208 in greater detail, in accordance with one example.

The processing resource 202 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing of the instructions 206 stored in the machine-readable medium 204, or combinations thereof. The processing resource 202 may fetch, decode, and execute the instructions 206 stored in the machine-readable medium 204 to dynamically determine and adjust the response time for the source entity 102 to wait for a response from the target entity 104. As an alternative or in addition to executing the instructions 206, the processing resource 202 may include at least one integrated circuit (IC), control logic, electronic circuits, or combinations thereof that include a number of electronic components for performing the functionalities intended to be performed by the source entity 102 described hereinabove.

In some examples, the processing resource 202 may execute the instructions 206 to communicate a request for an action to the target entity 102, wherein the request is generated by the source entity 102 and is to be acted upon by the target entity 104 by performing one or more jobs. Further, the processing resource 202 may determine the response time ($T_{Response}$) corresponding to the action based on prior execution experience (e.g., the experienced time of execution) of one or more jobs associated with the action and a learning rate (e.g., the learning rate (LR)). Additional details of determining the response time ($T_{Response}$) are described in conjunction with FIG. 1. Moreover, the processing resource 202 may allow the source entity 102 to wait for a response corresponding to a completion of the action from the target entity 104 for at least a time duration corresponding to the response time ($T_{Response}$). Although not repeated herein, the processing resource 202 may enable the source entity 102 to perform various other operations such as, but not limited to, updating the experience table 208, determining the buffer deviation time ($T_{Buffer}$), retrieving the experienced time of execution ($T_{Experienced_i}$) corresponding to the one or more jobs from the experience table 208, recording the actual time duration for completion of the action ($T_{Actual}$), and updating the learning rate (LR), in a similar fashion as described in conjunction with FIG. 1.

FIG. 3 depicts an experience table, such as the experience table 208, in accordance with one example. The example experience table 208 as depicted in FIG. 3 may include various columns such as, but not limited to, columns 302, 304, 306, 308, and 310.

The column 302 may represent a job identifier (i). Further, the column 304 may represent an occurrence corresponding to a given job identifier. Although in the example of FIG. 3 the experience table 208 is shown to include multiple occurrences for a given job identifier, the experience table 208 may also be formed to include details of a most recent occurrence of a given job identifier (e.g., the 4th occurrence of Job-A and the $3^{rd}$ occurrence of Job-B). Furthermore, the column 306 may represent job names (e.g., Job-A, Job-B etc.) corresponding to a given job identifier. By way of an example, the jobs such as the Job-A and Job-B may represent individual jobs/functions to accomplish an action. For instance, Job-A may represent a job such as creating a VM and the Job-B may represent a job such as monitoring a resource. Moreover, the column 308 may represent an actual response time ($T_{Actual}$) corresponding to an occurrence of the given job identifier.

The column 310 may represent an experienced time of execution ($T_{Experienced_i}$) corresponding to an occurrence of the given job identifier. In the example of FIG. 3, the experienced time of execution ($T_{Experienced_i}$) may be represented in the form of moving average time. For example, for the 4th occurrence of Job-A, the experienced time of execution ($T_{Experienced_i}$) may be determined as $(((38+32)/2)+20)/2=27.5$.

As will be understood, in some examples, the experience table 208 may also include reduced number of columns. For example, the column 306 may be omitted. Further in some examples, the experience table 208 may also include different types and/or additional number of columns than depicted in FIG. 3, without limiting the scope of the present disclosure.

Figure 4:
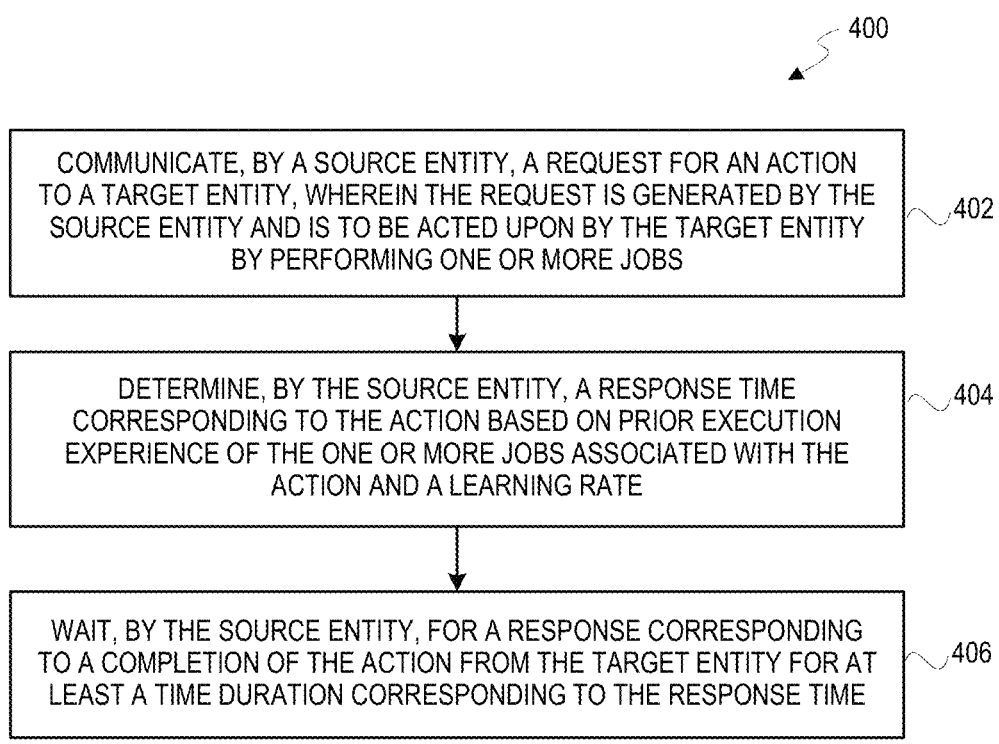
FIG. 4 is a flow diagram depicting a method for adjusting a response time, in accordance with an example.

Moving to FIG. 4, is a flow diagram depicting a method 400 for adjusting a response time is presented, in accordance with an example. The method 400 will be described in conjunction with the system 100 of FIG. 1 and the system 200 of FIG. 2. As will be appreciated, method blocks 402, 404, and 406 (hereinafter collectively referred to as blocks 402-406) may be performed by a processor based system, for example, the source entity 102 or the response time adjustment system 200. In particular, each of the method blocks 402-406 may be executed by the processing resource 202 by executing the instructions 206 stored in the machine-readable medium 204.

At block 402, a request for an action to may be sent from the source entity 102 to the target entity 104, for example. The request may be generated by the source entity 102 and is to be acted upon by the target entity 104 by performing one or more jobs. Further, at block 404, the source entity 102 may determine a response time corresponding to the action based on prior execution experience of the one or more jobs associated with the action and a learning rate. For example, as described in conjunction with FIG. 1, the source entity 102 may determine the response time ($T_{Response}$) based on the experienced time of execution ($T_{Experienced_i}$) corresponding to the one or more jobs (e.g., jobs i to n) and the learning rate (LR). In one example, the processing resource 202 may determine the response time using the relationship of equation (2). Accordingly, a response time counter in the source entity may be set to a value of the response time ($T_{Response}$). Moreover, at block 406, the source entity 102 may wait for a response corresponding to a completion of the action from the target entity 104 for at least a time duration corresponding to the response time ($T_{Reponse}$). Additional method blocks and/or additional details of the method blocks 402-406 are described in conjunction with FIG. 1 and/or FIG. 5.

Figure 5:
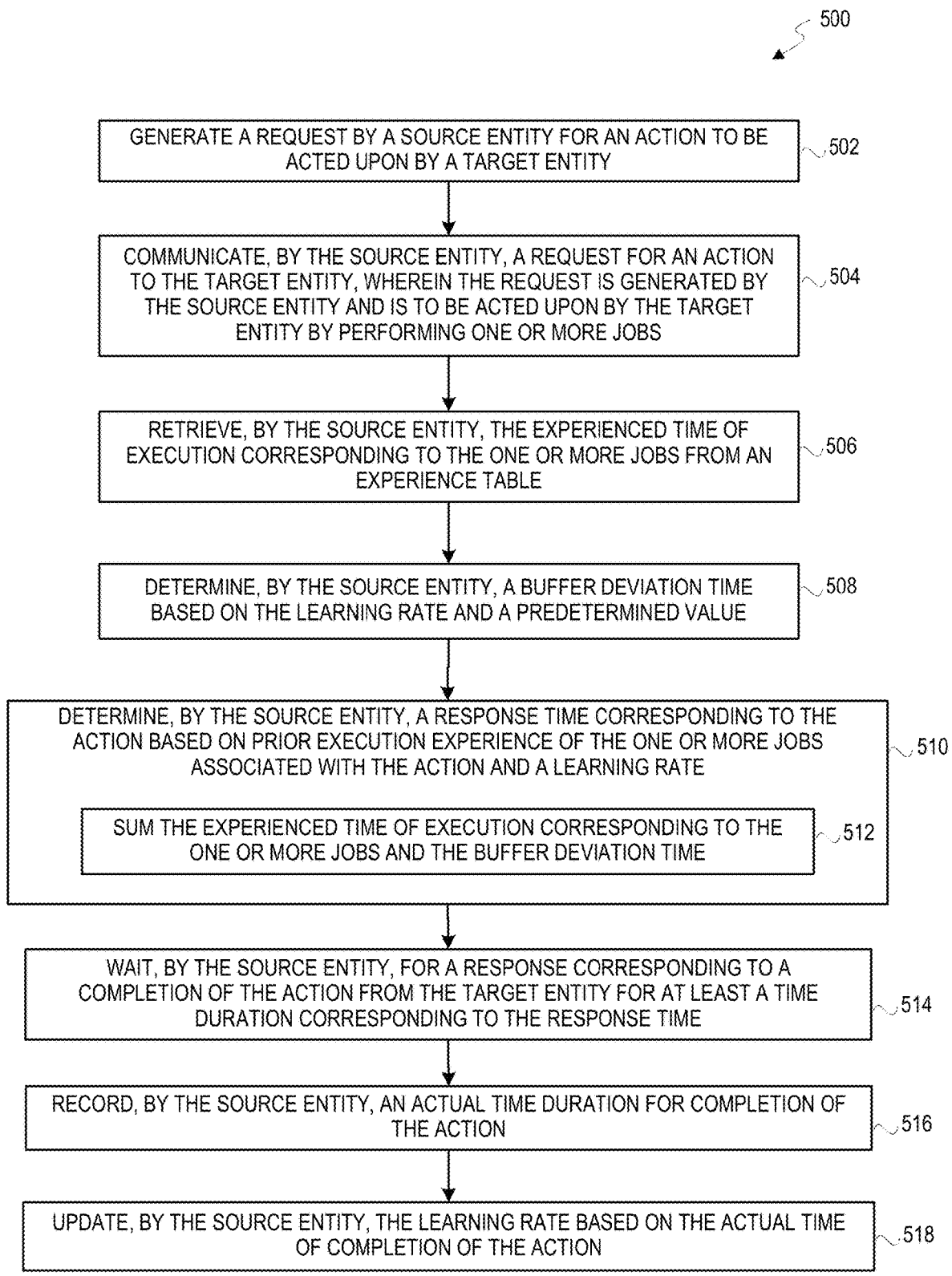
FIG. 5 is a flow diagram depicting a detailed method for adjusting a response time, in accordance with another example.

Turning now to FIG. 5, a flow diagram depicting a detailed method 500 for adjusting a response time is presented, in accordance with another example. The method 500 will be described in conjunction with the system 100 of FIG. 1 and the system 200 of FIG. 2. Further, the method 500 of FIG. 5 includes certain blocks that are similar to one or more blocks described in FIG. 4, details of which are not repeated herein for the sake of brevity. As will be appreciated, various method blocks of FIG. 5 may be performed by a processor based system, for example, the source entity 102 or the response time adjustment system 200. In particular, the method 500 may be executed by the processing resource 202 by executing the instructions 206 stored in the machine-readable medium 204.

At block 502, the source entity 102 may generate a request for an action to be acted upon by the target entity 104. For example, the source entity 102 may generate a request corresponding to actions such as, but not limited to, action relating to command distribution, process execution, communication protocol, and/or any other actions to be processed, executed, or otherwise fulfilled by the target entity 104. Further, at block 504, the source entity 102 may communicate the request to the target entity 104. The request may be communicated from the source entity 102 to the target entity 104 via the link 106 in a similar fashion as described in conjunction with FIG. 1.

Furthermore, at block 506, in some examples, the source entity 102 may retrieve the experienced time of execution ($T_{Experienced_i}$) corresponding to the one or more jobs from an experience table 208. For example, if a given action may entail performing a Job-A and a Job-B (see FIG. 3), the source entity 102 may retrieve the experienced time of execution ($T_{Experienced_i}$) corresponding to the Job-A and the Job-B from the experienced table 208. In particular, the source entity 102 may retrieve the experienced time of execution ($T_{Experienced_i}$) corresponding to a latest/most recent occurrence (e.g., (e.g., the 4th occurrence of Job-A and the $3^{rd}$ occurrence of Job-B)) of the Job-A and the Job-B from the experienced table 208.

Moreover, at block 508, the source entity 102 may determine/calculate a buffer deviation time ($T_{Buffer}$). In some examples, the source entity 102 may determine the buffer deviation time ($T_{Buffer}$) based on the learning rate (LR) and the predetermined value (PV) using the relation of the equation (1), for example.

Further, at block 510, the source entity 102 may determine the response time ($T_{Response}$) based on the experienced time of execution ($T_{Experienced_i}$) corresponding to the one or more jobs (e.g., jobs i to n) and the learning rate (LR). In one example, determining the response time may include summing the experienced time of execution ($T_{Experienced_i}$) corresponding to the one or more jobs (e.g., jobs i to n) associated with the action and the buffer deviation time ($T_{Buffer}$), as indicated by block 512. For example, at block 512, the processing resource 202 may determine the response time ($T_{Response}$) using the relationship of equation (2). Furthermore, at block 514, the source entity 102 may wait for a response corresponding to a completion of the action from the target entity 104 for at least a time duration corresponding to the response time ($T_{Response}$).

Additionally, in some examples, once the action is acted-upon by the target entity 104 and the response is received from the target entity 104 by the source entity 102, the source entity 102 may determine an actual response time ($T_{Actual}$). As previously noted, the source entity 102 may determine the actual response time ($T_{Actual}$) as a time duration between a time at which the request has been communicated to the target entity 104 and the receipt of the response from the target entity 104. At block 516, the source entity 102 may record such response time ($T_{Actual}$) by storing the actual response time corresponding to the action in the experience table 208. Further, in some examples, at block 518, the source entity 102 may update the learning rate (LR) may be updated based on a difference between the actual response time ($T_{Actual}$) and the determined response time ($T_{Reponse}$). Additional details of updating the learning rate (LR) is described in conjunction with FIG. 1.

Figure 6:
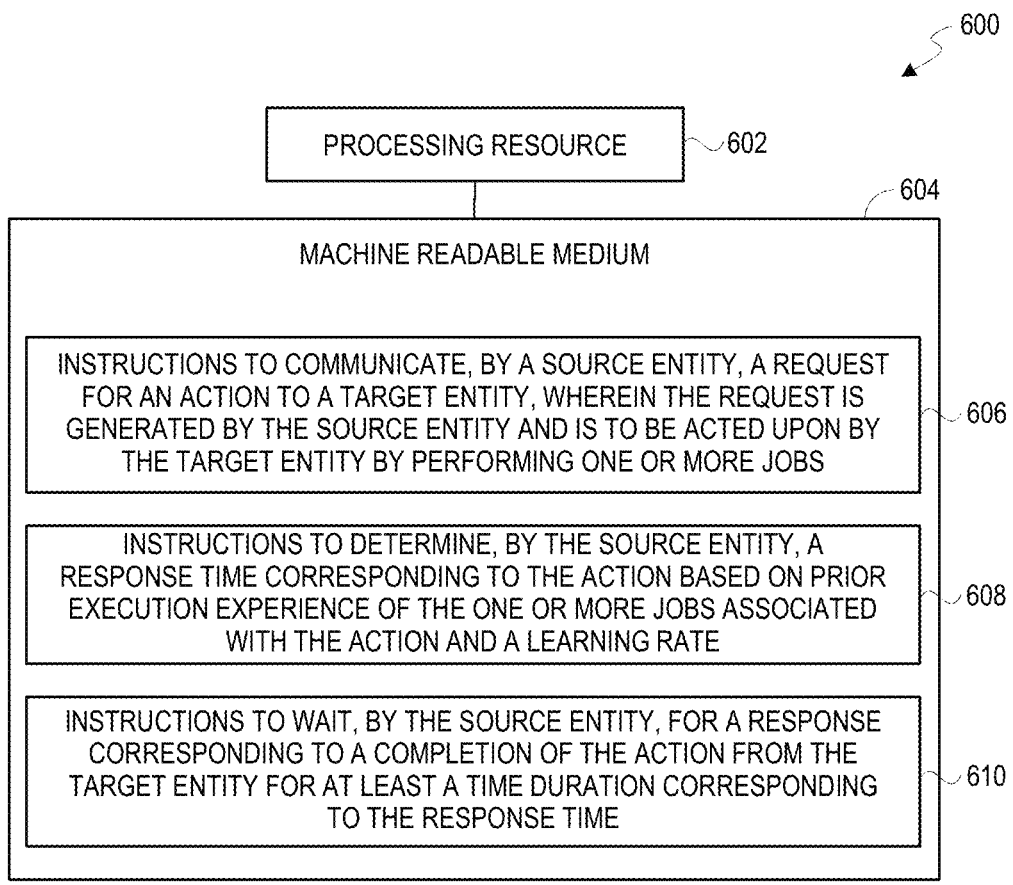
FIG. 6 is a block diagram depicting a processing resource and a machine-readable medium encoded with example instructions to adjust a response time, in accordance with an example.

In FIG. 6, a block diagram 600 depicting a processing resource 602 and a machine-readable medium 604 encoded with example instructions to dynamically adjust a response time is presented, in accordance with an example. The machine-readable medium 604 may be non-transitory and is alternatively referred to as a non-transitory machine-readable medium 604. In some examples, the machine-readable medium 604 may be accessed by the processing resource 602. In some examples, the processing resource 602 may represent one example of the processing resource 202 of the response time adjustment system 200 of FIG. 2. Further, the machine-readable medium 604 may represent one example of the machine-readable medium 204 of the response time adjustment system 200.

The machine-readable medium 604 may be any electronic, magnetic, optical, or other physical storage device that may store data and/or executable instructions. Therefore, the machine-readable medium 604 may be, for example, RAM, an EEPROM, a storage drive, a flash memory, a CD-ROM, and the like. As described in detail herein, the machine-readable medium 604 may be encoded with executable instructions 606-610 for performing one or more methods, for example, the method 400 described in FIG. 4. The instructions 606-610 may represent one example of the instructions 206 of FIG. 2. Although not shown, in some examples, the machine-readable medium 604 may also include additional instructions to execute the method 500 described in FIG. 5.

The processing resource 602 may be a physical device, for example, one or more CPU, one or more semiconductor-based microprocessor, one or more GPU, ASIC, FPGA, other hardware devices capable of retrieving and executing of the instructions 606-610 stored in the machine-readable medium 604, or combinations thereof. In some examples, the processing resource 602 may fetch, decode, and execute the instructions 606-610 stored in the machine-readable medium 604 to adjust a response time and allow the source entity 102 to wait for a response from the target entity 104 for a time duration corresponding to the response time. In certain examples, as an alternative or in addition to retrieving and executing the instructions 606-610, the processing resource 602 may include at least one IC, other control logic, other electronic circuits, or combinations thereof that include a number of electronic components for performing the functionalities intended to be performed by the response time adjustment system 200.

The instructions 606, when executed, may cause the processing resource 602 to communicate, from a source entity 102 such as the source entity 102, a request for an action to a target entity, such as, the target entity 104. The request may be generated by the source entity 102 and is to be acted upon by the target entity 104 by performing one or more jobs corresponding to the action. Further, the instructions 606, when executed, may cause the processing resource 602 to determine a response time corresponding to the action based on prior execution experience of the one or more jobs associated with the action and a learning rate. Moreover, the instructions 606, when executed, may cause the processing resource 602 to allow the source entity 102 to wait for a response corresponding to a completion of the action from the target entity 104 for at least a time duration corresponding to the response time.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   generating, by a source entity, a request for an action for performing one or more jobs;
   communicating, by the source entity, the request for the action to a target entity, wherein the request comprises instructions for the target entity to perform the one or more jobs;
   determining, by the source entity, a response time corresponding to the action based on prior execution experience of the one or more jobs associated with the action and a learning rate, wherein the learning rate is proportional to a response time range defining a difference between an actual response time and a determined response time;

waiting, by the source entity, for a response corresponding to a completion of the action from the target entity for at least a time duration corresponding to the response time; and upon determining that the action is incomplete within the time duration corresponding to the response time, aborting, by the source entity, the request for the action to the target entity.

2. The method of claim 1, wherein the response time is a wait time corresponding to an amount of time that the source entity is allowed to wait for a response about the request until a timeout state.

3. The method of claim 1, wherein the response time is an acknowledge time corresponding to an amount of time that the source entity is allowed to wait for an acknowledgement of the request until a timeout state.

4. The method of claim 1, wherein the prior execution experience is an experienced time of execution learned by the source entity.

5. The method of claim 4, wherein the experienced time of execution corresponding to a job of the one or more jobs is an average time of execution corresponding to all previous execution of the job.

6. The method of claim 4, wherein the experienced time of execution corresponding to a job of the one or more jobs is a moving average time of execution corresponding to all previous execution of the job.

7. The method of claim 4, further comprising retrieving the experienced time of execution corresponding to the one or more jobs from an experience table.

8. The method of claim 4, further comprising determining a buffer deviation time based on the learning rate and a predetermined value.

9. The method of claim 8, wherein determining the response time comprises summing the experienced time of execution corresponding to the one or more jobs and the buffer deviation time.

10. The method of claim 1, further comprising:
recording an actual time duration for completion of the action; and
updating the learning rate based on the actual time duration for completion of the action.

11. The method of claim 10, wherein the learning rate is updated based on a difference between the actual time duration for completion of the action and a determined response time.

12. The method of claim 10, wherein the learning rate increases when a difference between the actual time duration for completion of the action and the determined response time is a positive value.

13. The method of claim 12, wherein the learning rate decreases when a difference between the actual time duration for completion of the action and the determined response time is a negative value.

14. A system comprising:
a machine-readable medium storing executable instructions; and
a processing resource coupled to the machine-readable medium to execute the instructions to:
generate a request for an action for performing one or more jobs;
communicate the request for the action to a target entity, wherein the request comprises instructions for the target entity to perform the one or more jobs;
determine a response time corresponding to the action based on prior execution experience of one or more jobs associated with the action and a learning rate, wherein the learning rate is proportional to a response time range defining a difference between an actual response time and a determined response time;
wait for a response corresponding to a completion of the action from the target entity for at least a time duration corresponding to the response time; and
upon determining that the action is incomplete within the time duration corresponding to the response time, abort the request for the action to the target entity.

15. The system of claim 14, wherein the prior execution experience is an experienced time of execution learned by the source entity.

16. The system of claim 15, wherein the experienced time of execution corresponding to a job of the one or more jobs is a moving average time of execution corresponding to all previous execution of the job.

17. The system of claim 15, wherein the processing resource retrieves the experienced time of execution corresponding to the one or more jobs from an experience table.

18. The system of claim 15, wherein the processing resource determines a buffer deviation time based on the learning rate and a predetermined value.

19. The system of claim 18, wherein, to determine the response time, the processing resource sums the experienced time of execution corresponding to the one or more jobs and the buffer deviation time.

20. The system of claim 14, wherein the processing resource is to:
record an actual time duration for completion of the action; and
update the learning rate based on the actual time duration for completion of the action.

21. A non-transitory machine-readable medium storing instructions executable by a processing resource, the instructions comprising one or more steps for:
generating a request for an action for performing one or more jobs;
communicating the request from a source entity to a target entity, wherein the request comprises instructions for the target entity to perform the one or more jobs;
determining a response time corresponding to the action based on prior execution experience of one or more jobs associated with the action and a learning rate, wherein the learning rate is proportional to a response time range defining a difference between an actual response time and a determined response time;
allowing the source entity to wait for a response corresponding to a completion of the action from the target entity for at least a time duration corresponding to the response time; and
upon determining that the action is incomplete within the time duration corresponding to the response time, aborting the request for the action to the target entity.

22. The non-transitory machine-readable medium of claim 21, further comprising instructions to retrieve the experienced time of execution corresponding to the one or more jobs from an experience table.

23. The non-transitory machine-readable medium of claim 21, further comprising instructions to sum the experienced time of execution corresponding to the one or more jobs and a buffer deviation time to determine the response time, wherein the buffer deviation time is determined based on the learning rate and a predetermined number.

* * * * *